United States Patent Office 2,891,964
Patented June 23, 1959

2,891,964

CRYSTALLIZATION RESISTANT PHTHALOCYANINES

George Leathwhite Roberts, Jr., Somerville, N.J., assignor to American Cyanamid Company, New York, N.Y., a corporation of Maine No Drawing. Application May 15, 1957
Serial No. 659,210

12 Claims. (Cl. 260—314.5)

This invention relates to a crystallization-resistant phthalocyanine pigment which is essentially a mixture of two crystallization-susceptible phthalocyanine pigments, one of which has been treated with methylol phthalimide, and a process for producing said crystallization-resistant phthalocyanine pigment. The invention also includes said pigment when end-treated to improve the dispersing properties in lithographic varnishes, rubber, plastics, and alkyd flat paints. The invention is particularly advantageously applied to red shade unstable phthalocyanines such as copper phthalocyanine.

The pigments of this invention may be used as the sole pigment to give color to a system, or they may be used in conjunction with white pigments such as titanium dioxide, or with other colored pigments to give a desired color or shade or intensity to a wide variety of systems in which colored pigments are desired. A crystallization-resistant pigment is particularly valuable when used in systems having other colored pigments, as in such systems a loss of strength in one pigment shows up as both a change of intensity and of shade.

The nomenclature relating to phthalocyanine pigments has become confusing. The original form of copper phthalocyanine was of the thermodynamically stable, green shade modification, also characterized as the Robertson form from its X-ray diffraction pattern. This green shade form has been referred to as the alpha-form in such publications as R. H. Kienle, Official Digest, Federation of Paint and Varnish Production Clubs, No. 300, page 48, January 1950. Even though this was the first discovered form, and is the stable-form, and hence, entitled to proper designation as the alpha form, the green shade form has been referred to as the beta form by others in the field such as in United States Patent 2,556,726, F. W. Lane, "Copper-Phthalocyanine in Pigmentary Beta Form and a Process of Making the Same," June 12, 1951. To avoid further confusion of nomenclature, I refer hereinafter to the form first characterized by the Robertson X-ray diffraction pattern as the green shade form of a phthalocyanine, which is the thermodynamically stable form. The thermodynamically unstable form is referred to as the red shade form.

Phthalocyanines such as copper phthalocyanine exist in two common crystalline forms, as mentioned above. The usual synthesis yields a phthalocyanine of such large particle size as to have very poor pigmentary properties. The large particle size material is usually spoken of as crude phthalocyanine regardless of purity. The particle size must be reduced to pigmentary dimensions, usually less than about 2 microns maximum dimensions, and preferably with most of the particles with less than 0.1 micron maximum dimension.

The green shade form is conveniently produced in pigmentary form by salt grinding a phthalocyanine, frequently a crude, and treatment with a crystallizing organic liquid. Such a product is described and claimed in United States Patent 2,486,351, R. H. Wiswall, Jr., "Solvent Stable Metal Phthalocyanine Pigments and Method of Making the Same," October 25, 1949.

A common technique for bringing about such size reduction is by "acid pasting" which gives the red shade form.

A finely divided tinctorially strong red shade form of phthalocyanine is produced when phthalocyanine is dissolved in a dehydrating acid such as concentrated sulfuric acid, syrupy phosphoric acid, oleum, chlorsulfonic acid, and the like, and then precipitated by drowning the thus formed solution in water or dilute acid. The acid pasted pigment has excellent tinctorial qualities as formed.

The pigment particles thus formed have a large area per unit of weight, and exhibit certain properties common to finely subdivided materials. One of these is the tendency for crystal growth in the presence of a solvent in which the material is slightly soluble, and also reversion to the most stable crystal form. Finely divided phthalocyanine of the red shade form thus reverts to the green shade form, of larger crystal size so that there is both a change in shade from red to green and a loss of tinctorial strength. A large variety of organic solvents causes this transformation.

A good test for the crystallizing characteristics of a phthalocyanine pigment is to boil the phthalocyanine pigment in xylene for an hour, or heat it in toluene at 54° C. for 500 hours. The retention of tinctorial strength under these test conditions is indicative of the suitability of the pigment for uses in which the pigment is stored in contact with organic solvents such as found in paint or lacquer systems. Phthalocyanine pigments which retain their tinctorial characteristics are called crystallization-resistant, and those which lose strength are referred to as crystallization-susceptible.

It is desirable to have a solvent-stable red shade form of phthalocyanine pigment so that a broader range of color values is obtainable, but as set forth above such red shade pigments have generally not been crystallization-resistant.

In the past tinctorially strong non-crystallizing red shade metal phthalocyanine pigments have been produced under specialized conditions, as, for example, described in United States Patent 2,699,440, J. W. Eastes and T. F. Cooke, "Preparation of Phthalocyanine Pigments," January 11, 1955. This patent describes one method of making a non-crystallizing red shade pigment which involves the use of a metal phthalocyanine pigment which has been prepared in an autoclave in the presence of a saturated alicyclic hydrocarbon solvent.

Other attempts have been made to produce a stable phthalocyanine pigment in the red shade form by using mixtures of two or more metal phthalocyanines.

I have now found that a red shade phthalocyanine pigment which is crystallization-resistant may be prepared by mixing certain crystallization-susceptible red shade phthalocyanine pigments. It is most surprising that a mixture of two such crystallization-susceptible phthalocyanine pigment would result in a blend which is crystallization-resistant.

One of these red shade phthalocyanine pigments is the conventional normal crystallizing type of red shade pigment which may be prepared by any of the known methods for converting phthalocyanine to pigmentary size, such as acid pasting or salt grinding. For example, the starting phthalocyanine may be added to sulfuric acid, usually at a strength of greater than 90%, or to other dehydrating acid such as phosphoric acid under such conditions as to cause some or all of the phthalocyanine to go into solution. Usually about 1 part of phthalocyanine is added to 8 or more parts of the dehydrating acid and the resulting slurry is stirred at 75° C. or higher for at least one-half hour. The digested mixture is then drowned into a mixture of ice and water, adding additional ice as required to maintain the temperature at a low level, preferably in the neighborhood of about 0° C. or less. The final slurry contains pigmentary phthalocyanine in the red shade form, and the residual acid diluted with water. It is convenient to warm up this drowning mixture to aid in filtering it. Frequently the pigment slurry is warmed to about 60° C., filtered; the pigment washed acid-free, and isolated.

The second component may use the same or a different phthalocyanine as the starting material and is treated with a hydroxymethylimide of the formula:

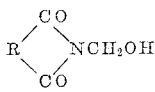

in which R is an ortho-phenylene radical. A method of preparing such a hydroxymethylimide treated phthalocyanine is described in United States Patent 2,761,868, Harold T. Lacey, "Sulfonated and Unsulfonated Imidomethyl, Carboxyamidomethyl and Aminomethyl Pthalocyanines," September 4, 1956. A particularly useful hydroxymethylimide is N-methylol phthalimide. Whereas it is stated in said Lacey patent that the phthalocyanine may be reacted at a temperature above about 40° C. in the presence of an acid dehydrating agent, I prefer to use temperatures of about 55° C. or higher and sulfuric acid at a concentration greater than 90% as the solvent, using at least about 8 parts of sulfuric acid per part of crude phthalocyanine. The mixture is stirred for preferably half an hour at which point from 0.2 to 1 part of the N-methylol phthalimide is added per part of crude phthalocyanine, the temperature raised to at least about 80° C. and held until digestion is complete. The digestion product is drowned in water as described in the preceding paragraph to give a product which is also a crystallizing pigment.

A blend of these two crystallizing phthalocyanine pigments such that the final product contains from two to seventy-five percent of the hydroxymethylimide based on the final weight of the phthalocyanine pigment, gives the new crystallization-resistant red shade pigment. Excellent results are obtained with a blend of about 1 part of the methylol phthalimide treated phthalocyanine to about 3 parts of the conventional phthalocyanine.

In the preparation of the crystallization-resistant pigment it is necessary that the two pigments be separately produced. For those produced by drowning, it is not necessary that they be isolated from the drowning bath before combination. In many instances it is convenient to drown both of the pigments, namely the straight pigment and the hydroxymethylimide treated pigment, in the same drowning bath. The pigments are precipitated from the dehydrating acid as that acid is diluted with water, and the pigments are thus formed separately, even though they are formed in the same drowning bath. Similarly the two digestions may be drowned in separate baths and these baths mixed before the pigments are separated from the drowning baths, or the pigments may be separated from the drowning baths and the press cakes mixed, or the final pigments themselves may be blended together. Any of these methods of preparation or orders of blending gives a blend of separate pigmentary particles, part of which are of the conventional red shade crystallizing phthalocyanine and the others are of the hydroxymethylimide treated red shade crystallizing phthalocyanine.

Conveniently the pigments used for both parts are the same phthalocyanine, although it is not necessary that they be so. Different phthalocyanines, for example, a copper and a metal-free phthalocyanine, may be used or a partially halogenated copper phthalocyanine and an unsubstituted copper phthalocyanine may be used to give crystallization-resistant products.

Outside of the preferred ranges a degree of crystallization-resistance is imparted to the pigment even though the pigment does not have the full crystallization-resisting characteristics of the preferred blends.

Also it is found that the crystallization-resistant pigments when treated in crystallizing solvents as above-mentioned, maintain their tinctorial value and shade. Pigments which crystallize tend not only to lose their tinctorial value but also turn to the green shade form of phthalocyanine. The shades are too different to be interchangeable. Shade stability is highly desirable in commercial products.

If the acid digestions are mixed while in the soluble form, or if the hydroxymethylimide such as N-methylol phthalimide is added in the smaller quantities to the digestion and the digestion mixture drowned, the product is less resistant to crystallizing.

It is preferred that the hydroxymethylimide be mixed in the ratio of at least 0.1 to 1 part hydroxymethylimide per part of pigment in its fraction of the blend and final pigment have from 2% to 75% of hydroxymethylimide therein based on the hydroxymethylimide used; some of which may be washed out.

Whereas the present novel treatment imparts crystallization-resistance to the pigment, there are many other characteristics which advantageously are imparted to the pigment by other forms of treatment. Among these forms of treatment, known as end-treatments, are treatments to give preferred agglomerative characteristics and treatments to improve the dispersion of the pigment in particular systems. Among these are the treatments with hydrophobic surface active agents such as barium rosinate, stearic acid, nonyl-phenoxy polyoxyethylene ethanol, or cationic agents such as dodecyl trimethyl ammonium chloride. These various end treatments which have been conventionally used may be adapted for use with the present novel pigment and the advantages imparted by the end treatments are effectively independent of the crystallization-resistance imparted by the use of the blend of the two types of crystallizing red shade phthalocyanines.

The particular end treatment may, of course, be used before or after the blending of the pigments with each other. Each of the pigments may have a different end treatment.

To better illustrate this invention certain specific aspects thereof are shown in the following examples. For comparative purposes certain of the examples show crystallizing types of pigments with or without end treatments which are used as components of the blends and show the difference to be expected as a result of the blend. Parts are by weight unless otherwise specified.

EXAMPLE 1

*Crystallizing acid pasted pigment*

Thirty parts of crude copper phthalocyanine are added to 360 parts of 98% sulfuric acid slowly by dusting. The mixture is heated to 80° C. and digested at this temperature for 1 hour. The hot mixture is drowned into a bath consisting of 1000 parts of ice and 1000 parts of water by pouring it slowly into the bath adding ice as necessary to keep the temperature at 0° C., about an adidtional 1000 parts is used. The slurry is stirred for one-half hour at this temperature, heated to 75° C. then filtered, washed acid-free with water, and dried. This product is a conventional acid pasted red shade crystallization-susceptible phthalocyanine pigment.

Five grams of this product are boiled in 100 milliliters of xylene for one hour. The resulting slurry is cooled, filtered, washed with 1 liter of ethanol and then 1 liter of water. The resultant press cake is dried. The resultant material is tested for color value against the same product before xylene treatment. The tinctorial strength of the product in one particular experiment was 52% as compared to the product before xylene treatment, and additionally the shade was greener. This indicates a loss of strength resulting from crystal growth and a change in shade from a partial conversion of the red shade form to the green shade form. The testing is by the Hoover muller technique:

0.5 gram dry pigment and 1.0 gram Number 1 transparent lithographic varnish (0.135% cobalt drier added) commonly referred to in the trade as UV1C, are placed on a Hoover muller. The two plates are closed under 150 lbs. pressure and the muller is rotated for 4 cycles of 100 revolutions each. After each cycle the ink is scraped to the central portion of the lower plate. 0.1 gram of this ink so produced is mixed with a similar paste prepared from linseed oil and zinc oxide. The resultant inks from each sample of pigment are drawn down side by side on bond paper. A film of about 1/16" thickness is prepared. The percent strength is judged by adjusting the colored ink until the intensities are equal. For example if 0.2 gram of colored ink from the xylene boiled sample is required to match the intensity of 0.1 gram ink from the unexposed sample, the strength of the xylene exposed sample would be 50% of the unexposed sample.

EXAMPLE 2

*Crystallizing methylol phthalimide treated pigment*

Thirty parts of crude copper phthalocyanine are added to 360 parts of 98% sulfuric acid, digested at 55° C. for one-half hour, 16 parts of N-methylol phthalimide are added, and digestion continued at 80° C. for 2½ hours. The product is then drowned into 1000 parts of ice and 1000 parts of water by adding it slowly to the ice bath, adding about an additional 1000 parts of ice as necessary to maintain the temperature at 0° C. The mixture is stirred for one-half hour at this temperature, then heated to 75° C., filtered, the pigment washed acid-free, and dried.

A sample of this product when tested by boiling in xylene for 1 hour and then comparing with the original pigment material by the procedure set forth in Example 1, gives a strength test of 50%±10%, and additionally the shade is greener indicating crystal growth and the change in the shade from the red shade form to the green shade form. It is thus seen that this product is not crystallization-resistant.

Other methods of forming a hydroxymethylimide treated phthalocyanine pigment are given in United States Patent 2,761,868, Lacey, supra. This patent discloses various dehydrating acids which may be used for the acid pasting process, and methods of adding N-methylol phthalimide as well as methods of forming the N-methylol phthalimide in situ, as well as other useful hydroxymethylimides.

EXAMPLE 3

*Crystallization-resistant blend of two crystallization-susceptible pigments*

Six parts of the pigment from Example 1 and 2 parts of the pigment from Example 2 are blended together by shaking and tumbling until a homogeneous mixture is obtained. Five grams of the blended product are boiled in 100 milliliters of xylene for 1 hour using the procedure set forth in Example 1.

The product which has been boiled in xylene is tested by the Hoover muller technique against the portion of the blend which has not received the boiling xylene treatment using the procedure set forth in Example 1. The strength of the two pigments are equal, and the shades are equal indicating that a crystallization-resistant pigment is obtained by mixing the two crystallizing pigments.

The pigment thus produced has no end treatment and accordingly has a tendency to aggregate and is more difficult to disperse in vehicles than is the same pigment processed with a suitable end-treatment. End treatments of the pigment are generally preferred. Certain of the end treatments are set forth in later examples.

EXAMPLE 4

*Crystallizing methylol phthalimide treated pigments*

The procedure of Example 2 is repeated except that 9 parts of crude copper phthalocyanine are used, being added to the 360 parts of 98% sulfuric acid, and 37 parts of N-methylol phthalimide are added.

For purposes of convenience in this disclosure, the ratio of methylol phthalimide added to copper phthalocyanine is used for descriptive purposes even though a certain amount of the methylol phthalimide does not react and/or is washed out in the drowning procedure. Infrared techniques or X-ray analysis or an analysis using ceric sulfate in titration will show the amount of methylol phthalimide which actually has remained in the phthalocyanine. These procedures are difficult to carry out and interpret. The absorption peak at 5.75 microns is indicative of the presence of carbonyl groups. The ratio of intensities shows the relative quantity of the carbonyl groups from substituent groups on the phthalocyanine nucleus, as well as unreacted methylol phthalimide, and bis-phthalimido-methyl ether.

When tested for crystallization-resistance by boiling for 1 hour in xylene, the product is not crystallization-resistant as the product loses 50%±10% of its strength.

EXAMPLE 5

*Pigment blend containing a high percentage of methylol phthalimide*

4.7 parts of the product obtained in Example 4 are blended with 0.3 part of the product obtained in Example 1. This blend has a methylol phthalimide content of 75% based on the starting materials. The two compositions are blended together giving a red shade copper phthalocyanine.

Five grams of the blend are boiled in 100 milliliters of xylene for 1 hour and tested using the Hoover muller technique described in Example 1 against the unboiled material. The blended material after boiling in xylene has approximately 75% of its original strength and is slightly green, indicating that the percentage of methylol phthalimide is too high to give a completely crystallization-resistant pigment, but that crystallization-resistance has been in part imparted to the blend by this treatment.

EXAMPLE 6

*Pigment end treated with dodecyl alcohol*

One part of crude copper phthalocyanine is dissolved in 12 parts of 98% sulfuric acid by dusting the copper phthalocyanine slowly into the acid. The suspension is stirred at 75° C. for 1 hour and then drowned in 67 parts of ice and water. The temperature is maintained between 0° and 4° C. during the drowning, about 33 parts additional ice being added in 6.5 part portions as necessary to maintain temperature control. The final volume is about 100 parts. The suspension of the pigment is heated to 75° C., filtered, and the pigment washed acid-free.

Fifty parts of real copper phthalocyanine prepared as by the above process contained in 225 parts of wet press cake is mixed with 800 parts of water and the mixture stirred until fluid. 4.5 parts of dodecyl alcohol are added to this fluid mixture and the composition stirred for two hours at 80° C., after which it is filtered, washed with 2000 parts of water, and dried at 60° C.

When this pigment is boiled in xylene for 1 hour and then tested for strength in a Hoover muller test against the same pigment before boiling in xylene, the boiled pigment is found to be only about 50% as strong and of a greener shade indicating that it is not crystallization-resistant.

EXAMPLE 7

*Xylene sulfonic acid end treated methylol phthalimide pigment*

Thirty parts of crude copper phthalocyanine are dusted into 400 parts of 98% sulfuric acid. The mixture is heated to 55° C. for one-half hour with stirring and to this mixture is then added 16 parts of N-methylol phthalimide after which the temperature is raised to 85° C. and the mixture stirred at this temperature for 2½ hours. To the mixture is then added 135 parts of xylene sulfonic acid, slowly, and the temperature maintained at 80° C. for another half-hour. The mixture is then drowned into 2000 parts of a mixture of equal parts of ice and water, and additional ice added as necessary to keep the temperature below 4° C. The final volume is about 3000 parts. This mixture is stirred at 4° C. for a half-hour, then heated to 60° C., the slurry filtered, and the pigment washed acid-free, and then dried. The pigment produced is a methylol phthalimide treated red shade pigment with a xylene sulfonic acid end treatment.

Five grams of this product are boiled in 100 milliliters of xylene for 1 hour. The resultant slurry is cooled, filtered, the filter cake washed with a liter of ethanol, a liter of water, and then dried. The resultant pigment is tested for color value against the same product before the xylene treatment. Comparison of the tinctorial strength shows that the strength of the xylene boiled pigment is approximately 50% of that of the pigment before boiling and the shade is greener indicating a crystal growth. Infrared data indicates approximately 5% conversion of the red shade form to the green shade form. This pigment which contains 35% methylol phthalimide, based on the starting proportions, is thus not crystallization-resistant.

EXAMPLE 8

*Mixture of crystallizing pigments*

Four parts of the crystallizing red shade pigment prepared in Example 6 are blended with 1 part of the crystallizing pigment prepared in Example 7 by dry mixing the two pigments together until thoroughly blended. Five grams of the mixed pigment are boiled with xylene for 1 hour as set forth in detail in Example 1.

The boiled xylene slurry when examined under a microscope does not show crystals. The dry pigment resulting is evaluated by the Hoover muller technique using the procedure of Example 1 and found to be approximately 2% stronger than the same blend which has not been boiled in xylene, thus indicating that no crystal growth has occurred during the 1 hour boiling with xylene. The shade of the tint of the xylene boiled product is slightly redder than the shade of the product before boiling. No crystal transformation has occurred from the red shade form to the green shade form.

This shows that a mixture of these two pigments, each of which are crystallization-susceptible, is a crystallization-resistant pigment. The slight increase in strength may be due to the removal of impurities, or part of the end treating agents. The pigment itself as a result of the end treatment is satisfactory for use in lithographic varnishes, or paints, in which it is to be dispersed in organic solvents. As a result of the end treatment, the dispersion is comparatively easy.

EXAMPLE 9

*Crystallizing pigment from N-methylol phthalimide and lauryl alcohol treatments*

Thirty parts of crude copper phthalocyanine blue are stirred for one-half hour at 55° C. in 360 parts of 96% sulfuric acid. To this mixture is then added 16 parts of N-methylol phthalimide, the temperature raised to 85° C., and the solution stirred at this temperature for 2½ hours. The mixture is drowned into 2000 parts ice and water adding ice as necessary to keep the temperature below 4° C., resulting in a final volume of about 3000 parts. The slurry is stirred for ½ hour at less than 4° C., heated to 60° C., filtered, and the pigment washed acid-free. The wet press cake is reslurried in 800 parts of water and stirred in an Eppenbach mixer with 1.2 parts of dodecyl alcohol. The stirring is continued for 1 hour at a drive speed of 5000 revolutions per minute. The resultant slurry is then filtered, and the pigment dried at 60° C. 39.6 parts of pigment is obtained.

Five grams of this pigment is boiled in 100 milliliters of xylene for 1 hour and the resultant pigment evaluated by the Hoover muller method against the product before boiling. The tinctorial strength is found to be about 40%, and the shade is greener indicating that crystallization occurs.

EXAMPLE 10

*Lower-N-methylol phthalimide ratio*

Example 9 is repeated in identical fashion except that only 8.0 parts of N-methylol phthalimide is added to the solution. The final product weighs 35 parts and on evaluation gives a tinctorial strength of about 50% of its original value after the boiling in xylene for an hour, and the shade is also greener.

EXAMPLE 11

*Crystallization-resistant mixture*

One part of the pigment produced in Example 9 and 3 parts of the pigment produced in Example 6 are blended together by dry mixing until homogeneous. Five grams of this product are boiled in 100 milliliters of xylene for 1 hour as set forth in Example 1. The dry pigment is compared with the original blend and found to be slightly to moderately redder and the tint strength is 103% as compared with the starting material. This indicates that the pigment had not grown in particle size nor been transformed in crystal habit during the boiling in xylene, and consequently the pigment of this mixture is a crystallization-resistant pigment. This product contains 8.7% methylol phthalimide calculated on the basis of N-methylol phthalimide used as a starting material.

EXAMPLE 12

*Crystallization-resistant mixture*

One part of the copper phthalocyanine pigment from Example 10 and 3 parts of the copper phthalocyanine pigment of Example 6 are blended together by dry mixing until a homogeneous mixture is obtained. Five grams of this mixture is placed in 100 milliliters of xylene and boiled for 1 hour. Only a very few small crystals are observed when examined under a microscope. The pigment is separated from the xylene, and after being dried is compared with the original pigment using the Hoover muller technique. The tint strength is found to be 105 and the shade is considerably redder indicating that the product did not grow or change in crystal habit during the boiling in the xylene and that apparently some material was leached out giving a slightly stronger material.

Such blends, or mixtures, may be diluted with inert diluents to a desired type strength. In common with many other pigments it is desirable that the strength of each commercial batch be identical and because of variations in procedures in manufacture there is usually some slight difference between batches and accordingly each batch is diluted slightly so that the products as they move in commerce have identical characteristics insofar as their strength is concerned. The user is much more interested in having uniform strength than in having a pure pigment, or the strongest pigment obtainable.

The product of the blend may also be tested for flocculation resistance using the procedure described by Vesce. In this test a panel is completely covered with a spray coat of an enamel produced using the phthalocyanine pigment, and then after allowing the enamel to stand for one-half hour, the enamel is stirred by hand, and poured over a portion of the previously sprayed panel. The panel is then placed in a vertical position until the latter film has set and the degree of flocculation-resistance is calculated from the ratio of the strengths of the poured to the sprayed portions. Using this test on the present pigment there is only a slight difference in tinting strength, indicating that the pigment of this example is flocculation-resistant as well as crystallization-resistant.

EXAMPLE 13

*3.67% N-methylol phthalimide in mixture*

The procedure of Example 12 is repeated except that 0.7 part of the product of Example 10 and 3.3 parts of the product of Example 6 are used in the mixture. This results in a mixture which has 3.67% of N-methylol phthalimide based on the starting materials.

Five grams of the blended pigment is boiled in 100 milliliters of xylene for 1 hour and then evaluated by the Hoover muller technique as set forth in Example 1. As compared with the same pigment which has not received the boiling xylene treatment, the shade of the xylene treated pigment is slightly redder and has a strength of about 102%. This indicates that no crystal growth has occurred and the product has not changed in crystal form. This is a crystallization-resistant pigment.

EXAMPLE 14

*2.6% methylol phthalimide in mixture*

The procedure of Example 12 is repeated using 0.5 part of the product of Example 10 and 3.5 parts of the product of Example 6. The mixture is blended together until an intimate physical mixture is obtained.

When this blend is evaluated by boiling in xylene for 1 hour and testing the boiled pigment against the starting pigment it is found that the pigment is about 20% weaker and very slightly greener than the blend before boiling, indicating that 2.6% of N-methylol phthalimide treatment is not as effective as a higher N-methylol phthalimide treatment ratio in giving a crystallization-resistant product. The product is more crystallization-resistant than the untreated pigment or than either of the component pigments but it is not as crystallization-resistant as is a product containing slightly more of the N-methylol phthalimide treated phthalocyanine.

EXAMPLE 15

*16% N-methylol phthalimide in a pigment mixture*

Three parts of the N-methylol phthalimide treated copper phthalocyanine pigment from Example 10 is blended with 1 part of copper phthalocyanine from Example 6. After the mixture is blended together until an intimate physical mixture is obtained the product is tested in boiling xylene for crystallization-resistance. The xylene boiled pigment tests 105% in tinting strength and slightly redder than the mixture before boiling. This product has N-methylol phthalimide treatment ratio corresponding to 16% of the final mixture and is a crystallization-resistant pigment, as shown by this rigorous test.

EXAMPLE 16

*Dodecyl trimethyl ammonium chloride end treatment*

On part of crude copper phthalocyanine and 10 parts of 96% sulfuric acid are heated to 70° C. and held for 1 hour. The acid solution is then drowned in ice and water, keeping the temperature at less than 4° C. 0.05 part of dodecyl trimethyl ammonium chloride is added. The suspension is heated to 80° C., held for 2 hours, filtered, washed acid-free and dried. This pigment is easily dispersed in solvents, but is not crystallization-resistant.

EXAMPLE 17

*Crystallization-resistant mixture*

Three parts of the pigment from Example 16 is dry blended with 1 part of the pigment of Example 10.

Five grams of the mixture is boiled for 1 hour in 100 milliliters of xylene.

When the pigment which had been boiled in xylene is evaluated against the mixture without boiling in xylene, by the Hoover muller technique, it is observed that the shade is considerably redder and the tinting strength is 105% indicating that the blend does not show any indication of crystal growth or tendency to transform from the red shade form to the green shade form.

EXAMPLE 18

*Methylol phthalimide treatment of metal-free phthalocyanine*

9.0 parts of crude metal-free phthalocyanine and 18 parts of N-methylol phthalimide is slurried in 80 parts of phosphorus pentoxide and 70 parts of syrupy phosphoric acid (85%). The reaction mixture is heated to 75° C. and held for about 2½ hours. The slurry is then drowned in 700 parts of ice and water (50% ice). An additional 300 grams of ice is used to maintain the temperature at 0° C. The resultant aqueous slurry is heated at 60° C., filtered, the pigment washed acid-free, and dried at 60° C. About 17 parts of a bluish pigment is obtained.

Five grams of this product is slurried in 100 milliliters of xylene and refluxed for 1 hour. After cooling the slurry is filtered, and the press cake is washed with 1 liter of alcohol and 1 liter of water.

The press cake is dried and the dry powder is tested for tinctorial strength as outlined in Example 1. The product after boiling in xylene has a tinctorial strength of about 50% of the initial value.

EXAMPLE 19

*Acid pasted metal-free phthalocyanine*

Thirty parts of crude metal-free phthalocyanine are acid pasted using the procedure described in Example 1. The product is a crystallization-susceptible metal-free phthalocyanine pigment.

EXAMPLE 20

*Crystallization-resistant metal-free phthalocyanine*

3.0 parts of metal-free phthalocyanine prepared in Example 19 is blended with 1.0 part of N-methylol phthalimide treated metal-free phthalocyanine as prepared in Example 18.

The mixture of these two crystallization-susceptible pigments is tested by boiling in xylene for an hour, using the test procedure of Example 1, and the mixture is found to be crystallization-resistant. The tinctorial value before and after xylene treatment is essentially equal.

EXAMPLE 21

*Metal-free and copper phthalocyanine mixture— crystallization-resistant*

2.0 parts of the pigment from Example 9 is blended with 6.0 parts of metal-free phthalocyanine pigment as prepared in Example 19. 5.0 grams of this mixture is boiled in xylene as outlined in Example 1, and the finished product is tested against the remainder of the blend. The tinctorial strength and characteristics of the pigment before and after boiling in xylene is essentially equal.

EXAMPLE 22

*Partially chlorinated copper phthalocyanine*

30 parts of a partially chlorinated copper phthalocyanine crude (containing about 50% of the amount of chlorine necessary for a monochloro copper phthalocyanine) is acid pasted with N-methylol phthalimide by following the procedure described in Example 9. 5.0 grams of the resultant product is boiled in xylene as described in Example 1. The tinctorial strength of the xylene treated pigment is about 75% of that of the original pigment.

EXAMPLE 23

*Acid pasted partially chlorinated copper phthalocyanine*

Thirty parts of the same partially chlorinated copper phthalocyanine crude used in Example 22 are acid pasted using the procedure described in Example 1. The pigment so produced is crystallization-susceptible.

EXAMPLE 24

*Crystallization-resistant partially chlorinated copper phthalocyanine*

2.0 parts of the N-methylol phthalimide treated partially chlorinated copper phthalocyanine prepared in Example 22 is blended with 6 parts of the pigment produced in Example 23.

The mixture of these two crystallization-susceptible pigments is tested by boiling in xylene for an hour, using the test procedure of Example 1, and the mixture is found to be crystallization-resistant. The tinctorial value before and after xylene treatment is essentially equal.

EXAMPLE 25

*Blend with barium sulfate*

Five parts of the pigment of Example 11 is blended with 5 parts of pigmentary barium sulfate.

This lighter toned pigment is crystallization-resistant, and does not change in hue or strength when boiled in xylene for an hour, using the test procedures of Example 1.

EXAMPLE 26

*Blends*

Ten parts of the pigment prepared in Example 11 is blended with 10 parts of a phthalocyanine green pigment containing at least 14 clorine substituents per phthalocyanine ring. A blue-green pigment is obtained, which does not change in hue or strength when boiled in xylene for one hour, using the procedure set forth in Example 1.

The relative blueness or greenness can be varied by varying the proportions and titanium dioxide may be added to get pastel tints, as may be desired. Such a blend is particularly useful for the automotive industry, as the colors are strong, light-fast and durable. By using the present crystallization-resistant pigment, matching colors can be produced which are sufficiently stable to be sold as touch-up colors.

EXAMPLE 27

*Common drowning bath*

Fifty parts of copper phthalocyanine is dusted into 500 parts of 98% sulfuric acid. The temperature is raised to 80° C. and held at this temperature for 1 hour with stirring. The digestion mixture is then slowly drowned in a bath of 500 parts of ice and 500 parts of water. Ice is added during the drowning as necessary to keep the temperature at 0° C. or less. The slurry is allowed to age at 0° C. for an additional hour.

Meanwhile 5 parts of copper phthalocyanine is digested in 80 parts of 98% sulfuric acid by holding at 55° C. for one-half hour. Two and one-half parts of N-methylol phthalimide is then added with stirring. The temperature is raised to 80° C. and the mixture held at this temperature for 2½ hours.

This second portion of N-methylol phthalimide treated copper phthalocyanine is drowned into the same aqueous bath as now contains the freshly precipitated copper phthalocyanine from the first digestion. During this second drowning the temperature is held below 10° C. by the addition of ice as necessary. The volume of the precipitated slurry is then adjusted to 3500 parts with water, the slurry heated to 95° C. for 8 hours, cooled to 70° C. and then filtered. The filter cake is washed with water until the pH of the wash water is above 5.0. The cake is then dried at 60° C. and micropulverized.

The product as obtained is crystallization-resistant as is shown by adding 5 grams of the pigment to 100 milliliters of xylene, boiling the mixture for 1 hour as set forth in Example 1 and testing the dried boiled pigment against the pigment before xylene treatment for strength and other characteristics. The material is found to be crystallization-resistant, as the strength is approximately the same as before the xylene treatment.

The wet filter cake or the dried pigment may be subjected to conventional end treatments to impart the desired properties imparted by these end treatments to phthalocyanine pigments in general.

EXAMPLE 28

*Mixture of drowned baths*

Fifty parts of copper phthalocyanine is added to 500 parts of 98% sulfuric acid slowly and the mixture is heated to 80° C. and held at this temperature for 1 hour. The digestion mixture is then slowly drowned into 500 parts of ice and 500 parts of water adding ice as necessary to keep the temperature below 0° C. The slurry is allowed to age at 0° C. for 2½ hours.

A separate mixture is prepared of 5 parts of copper phthalocyanine in 80 parts of 98% sulfuric acid and the mixture is held at 55° C. for one-half hour. Two and one-half parts of N-methylol phthalimide is then added, the temperature raised to 80° C. and held for 2½ hours. The second digestion is drowned into a mixture of 100 parts of ice and water, adding ice as is necessary to keep the temperature below 0° C. This mixture is held for 2½ hours at 0° C.

The two mixtures are then mixed together to give a wet blending of the two phthalocyanine pigments, one N-methylol phthalimide treated and conventionally acid pasted. The resulting slurry is heated to 95° C. for 8 hours, cooled to 70° C., filtered and the filter cake washed until the pH of the wash water is above 5.0. The mixture is then dried at 60° C. and micropulverized.

This product when tested in boiling xylene is found to have approximately the same strength as before treatment with the boiling xylene and is a satisfactory crystallization-resistant pigment of substantially the same properties as the pigment produced in Example 27, and of substantially the same properties as the same pigments would give if separately drowned, washed, dried, micropulverized and blended in the dry form.

As stated above the pigments either in the wet press cake form or later may be end treated as desired to give the characteristics to the pigment which is imparted by the end treatment of choice.

The above examples are given by way of illustration only as obviously many variations on time, temperatures, orders of addition, types of crudes, and other variables may be incorporated depending upon the equipment available, the crude available, and the properties desired from the end treatment of the final material. Such variations, which are within the scope of the appended claims are part of the present invention.

I claim:

1. The process of claim 12 in which each portion of phthalocyanine digested in the dehydrating acid is separately drowned in a separate bath, and the two portions are then combined.

2. The process of claim 12 which comprises end-treating the pigment with a hydrophobic surface active agent.

3. The process of claim 12 in which the two portions of dehydrating acid treated phthalocyanine are separately drowned in the same aqueous bath.

4. A process for the preparation of a crystallization-resistant red shade copper phthalocyanine pigment which comprises digesting a portion of copper phthalocyanine in sulfuric acid, separately digesting a second portion of copper phthalocyanine and N-methylol phthalimide in sulfuric acid, the weight of the N-methylol phthalimide being at least 10% of the weight of the second portion of copper phthalocyanine, drowning the acid digested portions of copper phthalocyanine in at least one aqueous bath, and mixing the crystallization-susceptible red shade copper phthalocyanine pigment and the crystallization-susceptible N-methylol phthalimide treated red shade copper phthalocyanine pigment, said intimate mixture being crystallization-resistant.

5. The process of claim 4 in which each portion of copper phthalocyanine digested in sulfuric acid is separately drowned in a separate bath, and the two portions are then combined.

6. The process of claim 4 which comprises end treating the pigment with a hydrophobic surface active agent.

7. The process of claim 4 in which the two portions of sulfuric acid digested copper phthalocyanine are separately drowned in the same aqueous bath.

8. A crystallization-resistant phthalocyanine pigment comprising essentially an intimate physical mixture of crystallization-susceptible phthalocyanine pigment, selected from the group consisting of partially chlorinated and unchlorinated copper and metal-free phthalocyanine, and crystallization-susceptible N-hydroxymethylimide treated phthalocyanine pigment from said group, said N-hydroxymethylimide having the formula

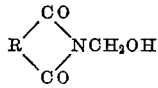

in which R is selected from the group consisting of ortho-phenylene and ethylene radicals, the amount of said N-hydroxymethylimide being from 2% to 75% by weight of the final pigment, said crystallization-resistant phthalocyanine pigment being characterized by maintaining its original strength and resisting phase transformation from a red shade to a green shade form when subjected to boiling in xylene for one hour.

9. The pigment of claim 8 having on the surface of the particles thereof a hydrophobic surface active agent, to make the pigment more readily dispersible in oil vehicle systems.

10. A crystallization-resistant copper phthalocyanine pigment comprising essentially an intimate physical mixture of crystallization-susceptible acid-pasted copper phthalocyanine pigment and crystallization-susceptible N-hydroxymethylphthalimide treated acid-pasted copper phthalocyanine pigment, the amount of said N-hydroxymethylphthalimide being from 2% to 75% by weight of the final pigment, said crystallization-resistant phthalocyanine pigment being characterized by maintaining its original strength and resisting phase transformation from a red shade to a green shade form when subjected to boiling in xylene for one hour.

11. The pigment of claim 10 having on the surface of the particles thereof a hydrophobic surface active agent, to make the pigment more readily dispersible in oil vehicle systems.

12. A process for the preparation of a crystallization-resistant phthalocyanine pigment which comprises digesting a first portion of phthalocyanine, selected from the group consisting of partially chlorinated and unchlorinated copper and metal-free phthalocyanines, in a dehydrating acid selected from the group consisting of sulfuric acid and phosphoric acid, separately digesting a second portion of phthalocyanine selected from said group of phthalocyanines and a N-hydroxymethylimide having the formula

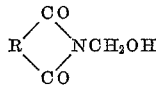

in which R is selected from the group consisting of ortho-phenylene and ethylene radicals in a second portion of said dehydrating acid, the weight of the N-hydroxymethylimide being at least 10% of the weight of the second portion of phthalocyanine, drowning the two portions of dehydrating acid digested phthalocyanine in at least one aqueous bath, and mixing the crystallization-susceptible phthalocyanine pigment and the crystallization-susceptible N-hydroxymethylimide treated phthalocyanine pigment, said intimate mixture being crystallization-resistant.

References Cited in the file of this patent

UNITED STATES PATENTS 2,713,005 Baunsgaard et al. _____ July 12, 1955
2,761,868 Lacey _____ Sept. 4, 1956

OTHER REFERENCES

F.I.A.T., final report #1313, vol. III, pp. 446–448 (1948).